(12) United States Patent
Stanek

(10) Patent No.: US 6,739,554 B1
(45) Date of Patent: May 25, 2004

(54) AIRCRAFT WEAPONS BAY ACOUSTIC RESONANCE SUPPRESSION SYSTEM

(75) Inventor: Michael J. Stanek, Springboro, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/456,143

(22) Filed: Jun. 2, 2003

(51) Int. Cl.[7] .................................................. B64C 1/38
(52) U.S. Cl. ...................................... 244/137.1; 244/130
(58) Field of Search ........................... 244/137.1, 137.3, 244/137.4, 136, 118.1, 130, 129.4

(56) References Cited

U.S. PATENT DOCUMENTS

| | | | | |
|---|---|---|---|---|
| 2,791,387 | A | * 5/1957 | Weinberg | 244/137.1 |
| 4,520,975 | A | * 6/1985 | Blackhurst | 244/137.4 |
| 4,802,641 | A | * 2/1989 | Hardy et al. | 244/137.4 |
| 5,018,688 | A | * 5/1991 | Stallings et al. | 244/137.4 |
| 5,340,054 | A | * 8/1994 | Smith et al. | 244/1 N |
| 5,660,357 | A | * 8/1997 | Grossman et al. | 244/121 |
| 5,699,981 | A | * 12/1997 | McGrath et al. | 244/1 N |
| 5,803,405 | A | * 9/1998 | Ellis et al. | 244/130 |
| 6,098,925 | A | * 8/2000 | Burdsall et al. | 244/118.1 |
| 6,186,445 | B1 | * 2/2001 | Batcho | 244/130 |
| 6,206,326 | B1 | * 3/2001 | Stanek et al. | 244/137.4 |
| 6,296,202 | B1 | * 10/2001 | Stanek | 244/1 N |
| 6,446,904 | B1 | * 9/2002 | Stanek | 244/1 N |
| 6,536,711 | B1 | * 3/2003 | Conway et al. | 244/129.5 |
| 6,540,179 | B2 | * 4/2003 | Henderson | 244/135 A |
| 6,622,967 | B2 | * 9/2003 | Weelden et al. | 244/137.4 |

* cited by examiner

Primary Examiner—Charles T. Jordan
Assistant Examiner—Stephen A. Holzen
(74) Attorney, Agent, or Firm—Richard A. Lambert; Bobby D. Scearce; Thomas L. Kundert

(57) ABSTRACT

A aircraft weapons bay acoustic resonance suppression system for reducing undesirable acoustic resonances within an open weapons bay of an aircraft in flight is described. The system includes a rod mounted upon and spaced a distance from an extensible aircraft spoiler. The rod has a hollow core and includes a multiplicity of apertures axially aligned into two groups, placed at the point of fluid separation. A multiplicity of synthetic jets are received within the rod, each jet in fluid communication with a corresponding aperture. The jets combine to form first and second perturbation elements. The perturbation elements are sinusoidally driven out of phase at high frequencies by an actuator. This effectively creates a high frequency forcing of the airstream which is amplified by the airflow, creating a violent shedding. Advantageously, this violent shedding dramatically reduces acoustic resonance within the weapons bay of the aircraft.

12 Claims, 4 Drawing Sheets

AIRCRAFT WEAPONS BAY ACOUSTIC RESONANCE SUPPRESSION SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to reducing open cavity acoustic resonance, and more particularly to an apparatus for reducing acoustic resonance within an open weapons bay of an aircraft in flight.

As is well known in the art, military aircraft will sometimes carry weapons to be discharged during flight within one or more cavities, commonly known as weapons bays. The weapons bays usually include a pair of doors, which are opened only when release of the weapon stores is anticipated. During the remainder of the aircraft flight, the weapons bay doors are closed, presenting a smooth surface to enhance aerodynamic performance as well as other characteristics, such as stealthiness, for example.

When the weapons bay doors are opened in flight, a thin region called a shear layer is created wherein the airflow abruptly transitions from a low speed flow inside the cavity to a high speed flow outside the cavity. This shear layer is characterized by instability which causes the shear layer to form tight, circular rotating pockets of flow commonly referred to as vortices. These vortices impinge on the rear wall of the cavity causing high levels of resonance and high acoustic levels inside the weapons bay. This acoustic resonance can be strong enough to damage the aircraft or its systems, and, therefore, is quite undesirable.

Attempts have been made in the past to reduce acoustic resonance occurring within an open aircraft weapons bay. For example, U.S. Pat. No. 5,699,981 to McGrath et al. describes a system incorporating a cylindrical member disposed on the surface of the aircraft near the leading edge of the cavity. The cylindrical member is projected into the airflow of aircraft in flight to create vortices to reduce acoustic resonance. Similarly, U.S. Pat. No. 5,340,054 to Smith et al. describes an apparatus for acoustic reduction using a series of perturbation pins placed on the surface of the aircraft for generating vortices to disrupt the shear layer, for the purpose of reducing acoustic resonances within an open cavity. U.S. Pat. No. 6,098,925 to Burdsall, II et al. describes a deployable ramp attached to the aircraft fuselage that is extended into the airstream when the weapons bay doors are open for suppressing open cavity acoustic resonances. While somewhat effective, these prior art systems are not without the need for improvement. For example, these patents describe systems requiring the attachment of structures onto the surface of the aircraft, increasing drag as well as significantly interrupting the desirable smooth aircraft surface. Moreover, their effectiveness decreases dramatically at aircraft speeds up to and exceeding Mach 1.

Recent investigations have focused on high frequency shear layer seeding. A system recently described by Parekh, D. E. et al., *Innovative Jet Flow Control: Mixing Enhancement Experiments*, AIAA Paper No. 96-0308, American Institute of Aeronautics and Astronautics, AIAA, Aerospace Sciences Meeting, 34th, Reno, Nev. Jan. 15–18, 1996, includes vibrating wedges driven by piezoelectric actuators. This system, while providing the proper high frequency range of operation, is unsuited for application to the weapons bay problem because it is incapable of providing sufficient amplitude.

A more effective solution to this problem is found in my U.S. Pat. No. 6,296,202, assigned to the assignee of the present invention. As described therein, an oscillatable spoiler plate is oscillated at high frequencies and amplitudes to seed the sheer layer with frequencies that compete with the shear layer vortices and correspondingly reduce or cancel damage within the open weapons bay. Another approach to reducing weapons bay damage is found in my U.S. Pat. No. 6,446,904, assigned to the assignee of the present invention wherein is shown and described an extensible spoiler plate incorporating at least one resonance tube to seed the shear layer with high frequencies, again for the purpose of competing with the shear layer vortices to reduce damage within the open weapons bay.

The last two approaches described above are quite effective in the reduction of acoustic resonance. However the size and weight of hardware required for the high frequency oscillators for the spoiler plate and the overall mass of air required to operate the resonance tube can be disadvantageous. Thus, it would be desirable in certain situations to have an alternative approach to these acoustic resonance reduction systems. The alternative system would desirably provide improved acoustic resonance reduction enhancing aircraft operation as well as contributing to aircraft longevity.

SUMMARY OF THE INVENTION

Accordingly, it is a primary object of the present invention to provide an aircraft weapons bay acoustic resonance suppression system overcoming the limitations and disadvantages of the prior art.

It is another advantage of the present invention to provide an aircraft weapons bay high frequency suppression apparatus providing acoustic resonance reduction over a wide range of aircraft operating conditions.

It is yet another object of the present invention to provide an aircraft weapons bay high frequency suppression apparatus which can be readily incorporated into existing aircraft structures and systems.

It is still another object of the present invention to provide an aircraft weapons bay high frequency suppression apparatus which can be utilized on a wide variety of aircraft.

These and other objects of the invention will become apparent as the description of the representative embodiments proceeds.

In accordance with the foregoing principles and objects of the invention, an aircraft weapons bay high frequency suppression apparatus is provided to dramatically reduce acoustic resonance within an open weapons bay of an aircraft in flight. The apparatus can be incorporated into a wide variety of aircraft and can be utilized in a wide range of operating conditions.

As is known in the art, opening the weapons bay doors in flight gives rise to the creation of a thin region called a shear layer where the airflow abruptly transitions from a low speed flow inside the cavity to a high speed flow outside the cavity. This shear layer is characterized by instability which causes the shear layer to form tight, circular rotating pockets of fluid flow commonly referred to as vortices. These vortices impinge on the rear wall of the cavity and correspondingly generate an acoustic wave which propagates in the opposite way, upstream. The acoustic wave thus generated interacts with the shear layer to influence the size and spacing of the vortices. If the frequency and phase of the acoustic wave coincides with that of the shear layer instabilities, the vortices generated by this "forced" shear layer can become a whole number (1, 2, 3, etc.) with respect to the cavity, generating high levels of undesirable acoustic resonance. The effects of this can be often be strong enough to damage the aircraft or its systems, and, as can be appreciated, are quite undesirable.

According to the aircraft weapons bay acoustic resonance suppression system of the present invention, a rod in the form of a hollow cylinder is extended into the airstream of the aircraft in flight. The rod can be utilized alone or it can be mounted atop a spoiler which in turn is extensible into the airstream. The rod acts as a passive high frequency tone generator, based upon the phenomenon known as Karman vortex shedding and is quite effective at reducing acoustic resonances at certain aircraft operating parameters. See, for example, U.S. Pat. No. 5,699,981 assigned to the assignee of the present invention for a description of this device. A drawback to this passively operated device, however, lies in the fact that it is rendered operationally ineffective as aircraft speeds approach and exceed Mach 1. The present invention overcomes this problem to provide dramatic acoustic resonance reduction over the entire range of aircraft operating conditions.

Advantageously, and according to an important aspect of the present invention the rod is an active device and includes at least one pair of synthetic jets within its hollow interior. The rod is preferably mounted upon an existing aircraft spoiler, but can also be effectively used in a stand alone manner depending on aircraft configuration or equipment. The synthetic jets are placed in fluid communication with corresponding apertures within the cylindrical wall of the rod. The apertures are placed in the rod at the lee (downstream) location of shear layer separation and thus are axially aligned into two groups. In this manner, the synthetic jets correspondingly combine to form first and second perturbation elements.

Each synthetic jet includes an internal oscillatable diaphragm with a driver mounted thereon. In the preferred embodiment, the driver is a piezoceramic element. An actuator provides the sinusoidal waveform for actuating the piezoceramic driver element which in turn causes the jet diaphragm to oscillate. This oscillation, when initiated at high frequencies, causes the synthetic jets to inject momentum into the freestream. This creates a high frequency forcing of the airstream, and in turn, effectively creates a trigger for initiating "Karman-like" alternating vortex shedding behind the cylinder. The airflow itself amplifies these small perturbations, creating a violent shedding. Advantageously, this violent shedding dramatically reduces acoustic resonance within the weapons bay of the aircraft.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
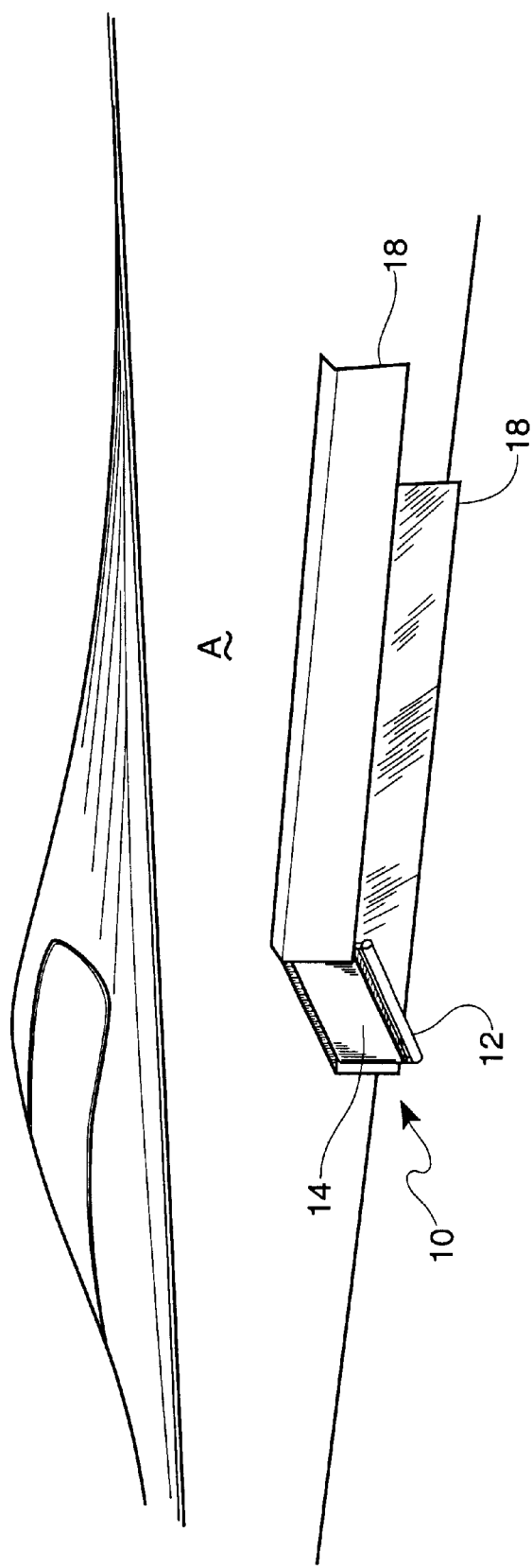
FIG. 1 is a perspective view of the aircraft weapons bay acoustic resonance suppression system of the present invention shown mounted on an aircraft, and extended into the operational position.

Reference is made to the drawing figures showing the aircraft weapons bay acoustic resonance suppression system 10 of the present invention. The acoustic resonance suppression system 10, is provided to dramatically reduce acoustic resonance within an open weapons bay of an aircraft in flight.

Figure 2:
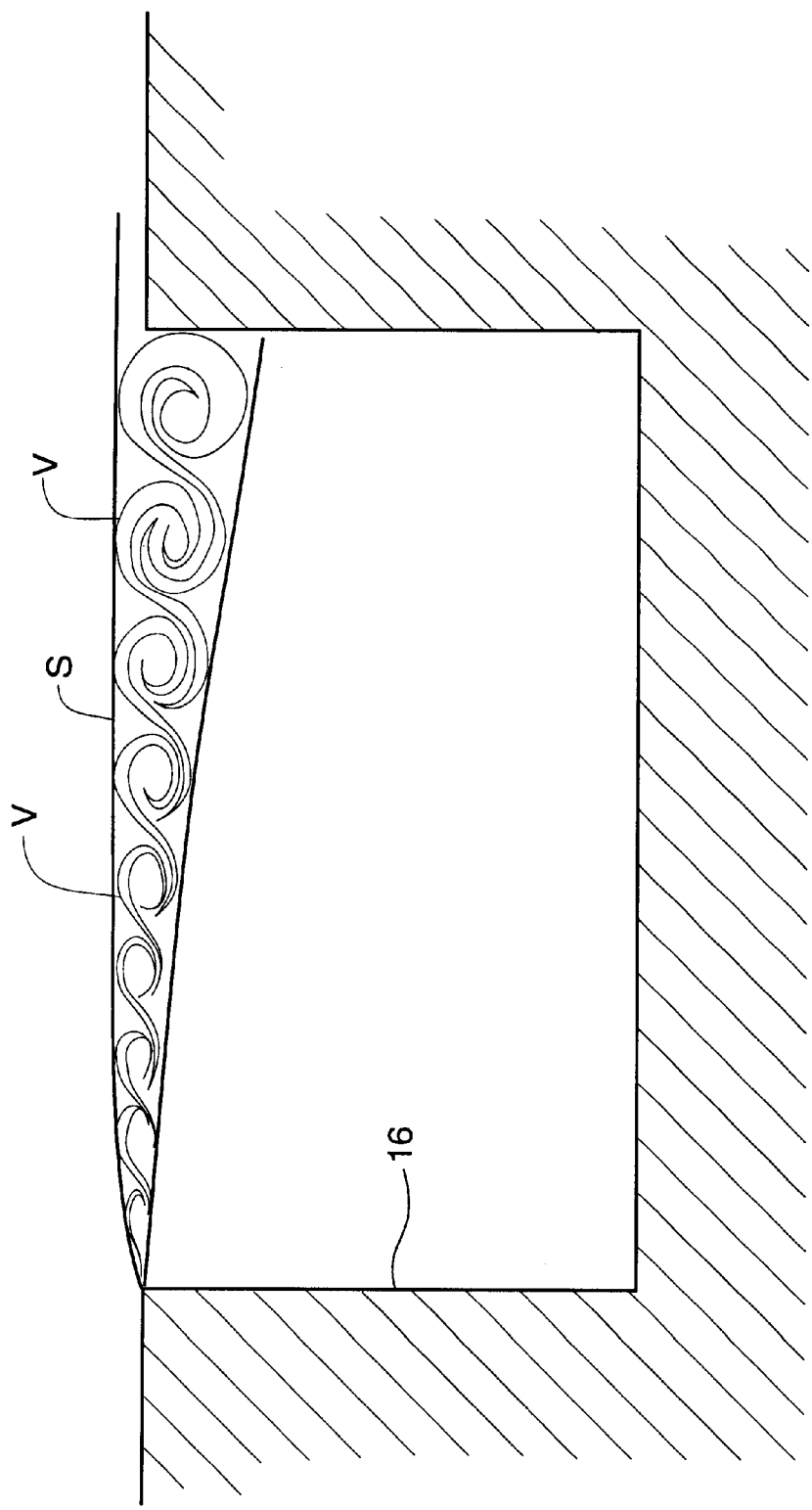
FIG. 2 is a diagrammatic view illustrating the formation of shear layer vortices across an open aircraft cavity.

Reference is directed to FIG. 2 wherein a representative shear layer S is shown having formed across an open cavity of an aircraft in flight. The shear layer S develops as the airflow abruptly transitions from a low speed flow inside the cavity to a high speed flow outside the cavity. This shear layer S is characterized by an instability which causes the shear layer S to form tight, circular rotating pockets of fluid flow commonly referred to as vortices V to form. These vortices V impinge on the rear wall of the cavity and correspondingly generate an acoustic wave (not shown) which propagates in the opposite way, upstream. The acoustic wave thus generated interacts with the shear layer to influence the size and spacing of the vortices. If the frequency and phase of the acoustic wave coincides with that of the shear layer instabilities, the vortices generated by this "forced" shear layer can become a whole number (1, 2, 3, etc.) with respect to the cavity, generating high levels of undesirable acoustic resonance. The effects of this can be often be strong enough to damage the aircraft or its systems, and, as can be appreciated, are quite undesirable.

Figure 3:
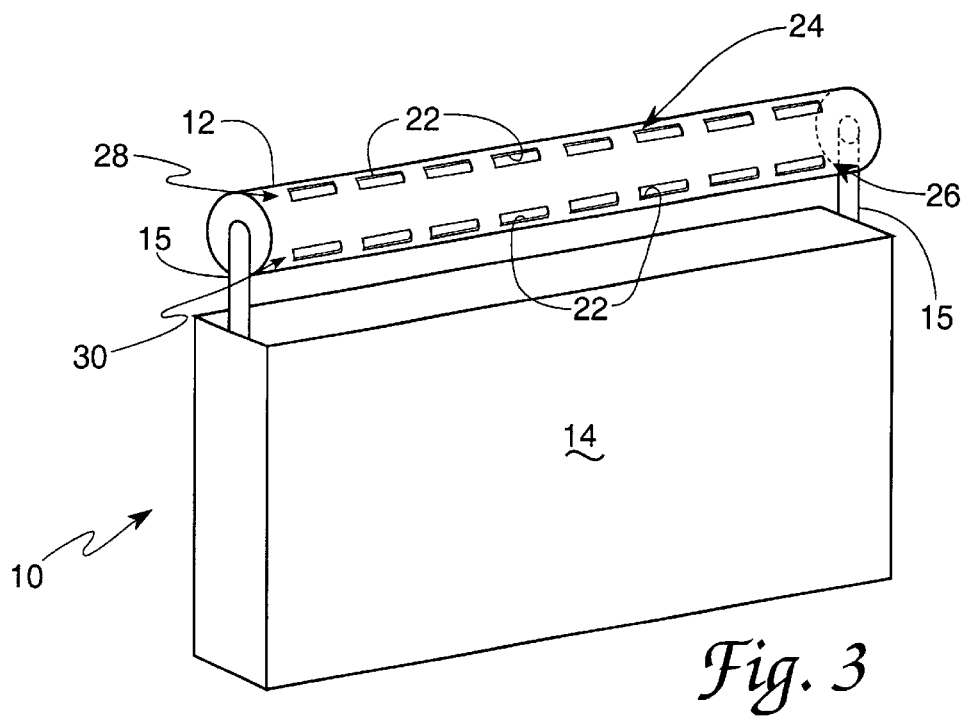
FIG. 3 is a perspective view of the aircraft weapons bay acoustic resonance suppression system of the present invention incorporating an aircraft spoiler.

As shown in FIGS. 1 and 3, the aircraft weapons bay acoustic resonance suppression system includes a rod 12 shown mounted upon an existing, deployable aircraft spoiler 14. Deployable aircraft spoilers are used on a wide variety of aircraft to assist in weapons separations. They are usually retained within the weapons bay 16 adjacent the leading edge thereof and extended into the airstream of the aircraft A in flight, often simultaneously with the opening of the weapons bay doors 18 in preparation for weapons release.

While the invention will be described primarily in terms of the rod 12 mounted upon a spoiler 14, the invention is not considered so limited. The rod 12 can be effectively utilized absent the spoiler 14 altogether. In such a configuration, the rod 12 would be mounted so as to be positionable a distance into the airstream of the aircraft in flight. The operation of the apparatus remains the same in all other respects.

It has been determined that the optimum separation distance from the rod 12 to the spoiler 14 (or aircraft fuselage)

is based upon the thickness of the shear layer approaching the cavity, sometimes referred to as the aircraft boundary layer. The optimal position of the rod is such that the center of the circular rod cross-section is set at the outer edge of the incoming boundary layer, with the edge of the boundary layer essentially "splitting" the center of the rod. The separation distance is maintained by suitably fabricated legs 15. The rod acts a passive high frequency tone generator, based upon the phenomenon known as Karman vortex shedding and is quite effective at reducing acoustic resonances at certain aircraft operating parameters. A drawback to this passively operated device, however, lies in the fact that it is rendered operationally ineffective as aircraft speeds approach and exceed Mach 1. The present invention overcomes this problem to provide acoustic resonance reduction over the entire range of aircraft operating conditions.

Figure 4:
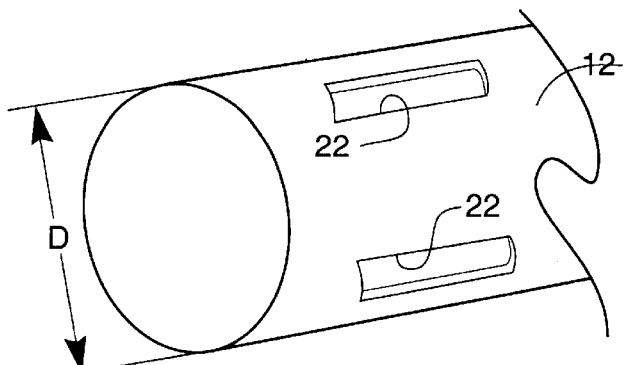
FIG. 4 is a partial view of the rod utilized in the aircraft weapons bay acoustic resonance suppression system of the present invention.
Figure 6:
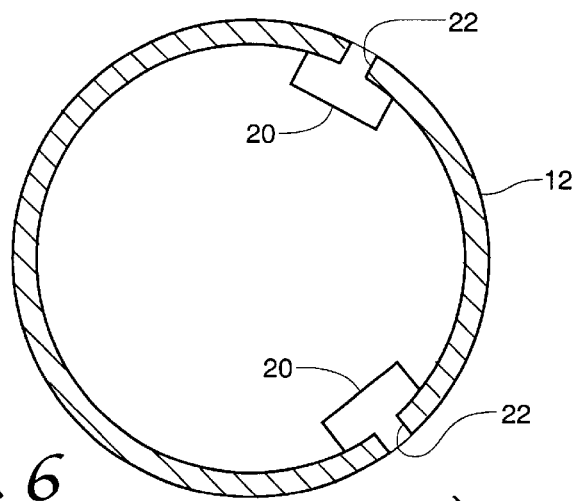
FIG. 6 is a cross sectional view of the rod utilized in the aircraft weapons bay acoustic resonance suppression system of the present invention showing a pair of synthetic jets mounted therein.

Advantageously, and according to an important aspect of the present invention the rod 12 has been modified to become an active device by the inclusion of at least one pair of synthetic jets 20 within its hollow interior. Background material related to synthetic jets which may be helpful in understanding the invention may be found by reference to "The Formation and Evolution of Synthetic Jets", by Smith et al., Physics of Fluids, Vol. 10, No. 9, American Institute of Physics (September 1998), and the references cited therein, the entire teachings of which are incorporated by reference herein. The synthetic jets 20 are placed in fluid communication with corresponding apertures 22 (see FIGS. 3 & 4) within the cylindrical wall of the rod, as shown in FIG. 6. The apertures 22 are placed in the rod at the lee (downstream) location of shear layer separation and are axially aligned into two groups 24 and 26. The synthetic jets 20 therefore combine to form first and second perturbation elements, 28 and 30 respectively.

Figure 5:
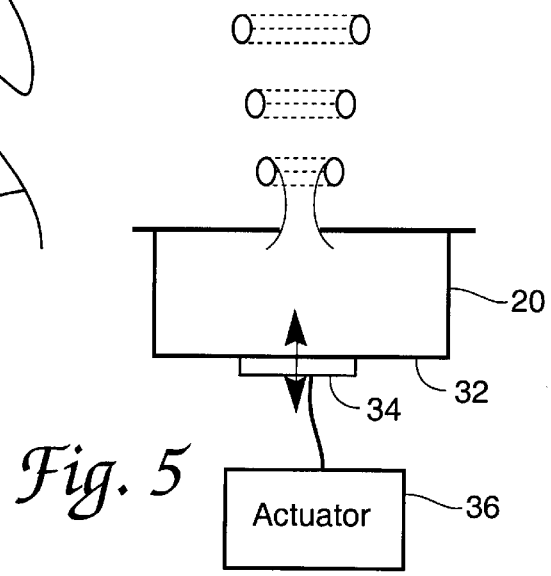
FIG. 5 is a diagrammatic cross sectional view of a high frequency synthetic jet utilized in aircraft weapons bay acoustic resonance suppression system of the present invention.

Reference is now made to FIG. 5. The synthetic jets 20 each include an oscillatable diaphragm 32 with a driver element 34 located thereon. The driver element 34 is commonly a piezoceramic device. An actuator 36 provides a sinusoidal driving waveform for actuating the piezoceramic driver element 34 which in turn causes the oscillatable diaphragm 32 to oscillate (see the action arrow). This oscillation, when initiated at high frequencies, causes the synthetic jets to inject momentum into the freestream as diagrammatically shown in the drawing figure, creating a high frequency forcing of the airstream, and in turn, effectively creating a trigger for initiating "Karman-like" alternating vortex shedding behind the cylinder. The airflow itself amplifies these small perturbations, creating a violent shedding.

The shedding frequency behind a cylinder oriented crosswise to a freestream flow can be conveniently expressed by a non-dimensional parameter called the Strouhal number. The Strouhal number is defined as the shedding frequency times the cylinder diameter divided by the freestream velocity. Over a wide range of Reynolds numbers (a wide range of aircraft speed), the Strouhal number is found to have an approximate constant value of 0.2. In the present invention, the rod 12 is partially immersed in the aircraft shear layer or boundary layer which is at a lower velocity, on average. Accordingly, it has been determined by experimentation that in the present invention, the Strouhal number is an approximate constant value of 0.165. For additional explanation, see Stanek et al., *High Frequency Acoustic Suppression—The Mystery of the Rod-in-Crossflow Revealed*, American Institute of Aeronautics and Astronautics, AIAA 2003–007, (January 2003), incorporated by reference herein.

Advantageously, the present invention operates in an active manner to provide dramatic acoustic resonance reduction over the entire range of aircraft operating conditions and is not limited to reduction at aircraft speeds below Mach 1.0. This is effected by first and second perturbation elements 28, 30 as driven by the actuator 36. The actuator 36 computes the appropriate driving frequency based upon the aircraft speed and the cylinder diameter D, in light of the constant Strouhal number. This actively drives the apparatus of the present invention in real time to minimize acoustic resonance over the entire range of aircraft operation.

As will be described in more detail below, the first and second perturbation elements 28, 30 are driven out of phase with respect to each other. This can be accomplished any number of ways. For example, the sinusoidal waveform from the actuator 36 can be split by a tee with one tee output directed to the first perturbation element 28 (for example) and the second tee output directed into a phase shift circuit before being directed into the second perturbation element 30. This can be readily accomplished by commercial, off the shelf type equipment. Other methods of effecting phase shift as may be apparent to those having skill in the art may be implemented as well, without departing from the spirit and scope of the present invention.

Depending on factors such as cost, complexity, aircraft speeds, etc., the designer may utilize any number of synthetic jets 20 from just a pair to a multiplicity thereof. The choice of the number of jets 20 is based on the constraint that the desired operational outcome is to create a single, simultaneous (in phase) pulse along the length of the rod in order to provide strong, in phase vortex shedding along the entire rod span. Depending on physical aircraft parameters, this can even be accomplished sometimes with a single continuous slot.

Regardless of number, the synthetic jets 20 forming each perturbation element 28 and 30 are simultaneously operated by the signal generator/amplifier element actuator 36 as described above. The first and second perturbation elements 28 and 30 are preferably oscillated out of phase with each other. This phase mismatch can be as high as 180°, depending on specific conditions. This can perhaps best be understood by consideration of the passive vortex shedding behind the rod that naturally occurs at subsonic Mach numbers. This natural shedding occurs such that the shedding from the top of the rod is 180° out of phase with the shedding from the bottom of the rod. Moreover, this occurrence runs continuously, across the entire length of the rod. At supersonic conditions, however, the shedding across the rod, top and bottom, becomes chaotic, and uncorrelated. The present invention overcomes this and actively forces the shedding to occur in the same manner as under subsonic conditions, simultaneously along the span, thereby forcing the top line (sinusoidally) to operate 180° out of phase with the bottom line.

In some instances, it may be desirable to encourage even more violent shedding. This can be done by manipulating the phase between the waveform driving the perturbation elements, 28 and 30. This can be readily accomplished by adjusting the output of the phase shift circuit, described above.

Figure 7:
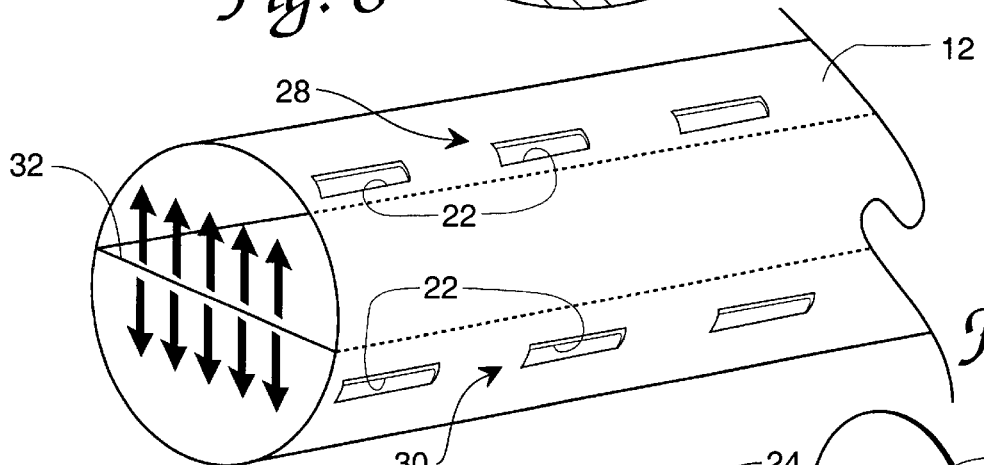
FIG. 7 is a perspective, cross sectional view of alternative embodiment of the aircraft weapons bay acoustic resonance suppression system of the present invention utilizing a single synthetic jet.

Reference is made to FIG. 7 wherein is shown an alternative embodiment of the present invention. As shown, a single diaphragm 32 forming a single synthetic jet is sealed within the rod 12 in lieu of individual synthetic jets 20. One or more driver elements 34 (not shown) would be attached to the diaphragm 32 at appropriate places. An actuator 36 would be utilized to provide a sinusoidal input to the driver elements 34 to oscillate the diaphragm 32 to provide the desired perturbations. The FIG. 7 embodiment has the very desirable feature of automatically keeping the first and second perturbation elements 28 and 30 180 degrees out of phase because as air is sucked into one side by the movement of the diaphragm, the air is automatically pushed out the other side.

Figure 8:
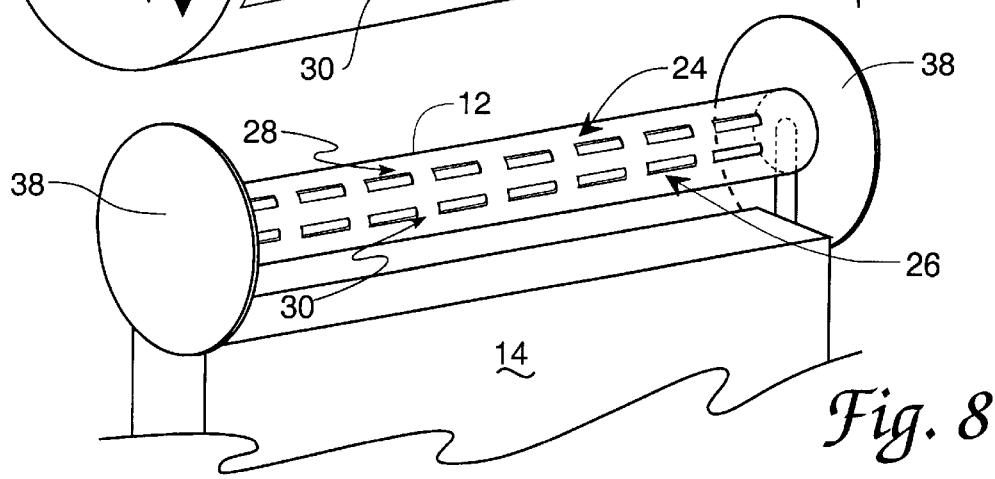
FIG. 8 is perspective view of the aircraft weapons bay acoustic resonance suppression system of the present invention utilizing a pair of endplates attached to the ends of the rod.

Reference is now made to FIG. 8 wherein the aircraft weapons bay acoustic resonance suppression system 10 is shown with the addition of endplates 38. The endplates 38 have been demonstrated to enhance performance of the system 10 in both supersonic and subsonic flow conditions. The endplates may have any number of different configurations such as square, etc. the circular configuration being shown for the purposes of illustration.

In summary, numerous benefits have been described from utilizing the principles of the present invention. The aircraft weapons bay acoustic resonance suppression system 10 provides for reduction of undesirable acoustic resonances within an open aircraft weapons bay in both subsonic and supersonic flight conditions. The system of the present invention utilizes few moving parts and can be readily adapted to fit on a wide variety of aircraft.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. An apparatus for suppressing acoustic resonance within an open cavity of an aircraft in flight, comprising:
    a rod having a hollow core, said rod being disposed laterally parallel to the fuselage of the aircraft and spaced a distance therefrom,
    a pair of apertures passing radially through the wall of said rod;
    a synthetic jet received within said hollow core of said rod and in fluid communication with each one of said apertures, said synthetic jet and said apertures correspondingly combining to form first and second perturbation elements;
    an actuator for driving said synthetic jet.

2. The apparatus of claim 1 further including a pair of endplates attached to the ends of said rod.

3. An apparatus for suppressing acoustic resonance within an open cavity of an aircraft in flight, comprising:
    a rod having a hollow core, said rod being positionable laterally parallel to the fuselage of the aircraft and spaced a distance therefrom;
    a pair of apertures passing radially through the wall of said rod;
    a pair of high frequency synthetic jets received within said hollow core of said rod, each one of said synthetic jets having an outlet in fluid communication with one of said apertures, said synthetic jets correspondingly combining to form first and second perturbation elements;
    an actuator for driving each of said first and second perturbation elements in a manner such that said first and second perturbation elements operate out of phase with each other.

4. The apparatus of claim 3 further including a pair of endplates attached to the ends of said rod.

5. An apparatus for suppressing acoustic resonance within an open cavity of an aircraft in flight, comprising:
    a rod having a hollow core, said rod being positionable laterally parallel to the fuselage of the aircraft and spaced a distance therefrom,
    a multiplicity of apertures passing radially through the wall of said rod, said apertures being aligned into two groups;
    a multiplicity of high frequency synthetic jets received within said hollow core of said rod, each one of said synthetic jets being in fluid communication with one of said apertures, said synthetic jets correspondingly combining to form first and second perturbation elements;
    an actuator for driving each of said first and second perturbation elements in a manner such that said first and second perturbation elements operate out of phase with each other.

6. The apparatus of claim 5 further including a pair of endplates attached to the ends of said rod.

7. An apparatus for suppressing acoustic resonance within an open cavity of an aircraft in flight, comprising:
    an extensible aircraft spoiler received within said cavity, said spoiler being adjacent the leading edge of said cavity and extensible into the airflow of the aircraft in flight, said spoiler having an outer edge for engaging the airflow;
    a rod having a hollow core, said rod being disposed substantially parallel to said outer edge of said spoiler and spaced a distance therefrom,
    a multiplicity of apertures passing radially through the wall of said rod, said apertures being aligned into two groups;
    a synthetic jet received within said hollow core of said rod and in fluid communication with each one of said apertures, said synthetic jet and said apertures correspondingly combining to form first and second perturbation elements;
    an actuator for driving said synthetic jet.

8. The apparatus of claim 7 further including a pair of endplates attached to the ends of said rod.

9. An apparatus for suppressing acoustic resonance within an open cavity of an aircraft in flight, comprising:
    an extensible aircraft spoiler received within said cavity, said spoiler being adjacent the leading edge of said cavity and extensible into the airflow of the aircraft in flight, said spoiler having an outer edge for engaging the airflow;
    a rod having a hollow core, said rod being disposed substantially parallel to said outer edge of said spoiler and spaced a distance therefrom;
    a pair of apertures passing radially through the wall of said rod;
    a pair of high frequency synthetic jets received within said hollow core of said rod, each one of said synthetic jets being in fluid communication with one of said apertures, said synthetic jets correspondingly combining to form first and second perturbation elements;

an actuator for driving each of said first and second perturbation elements in a manner such that said first and second perturbation elements operate out of phase with each other.

10. The apparatus of claim 9 further including a pair of endplates attached to the ends of said rod.

11. An apparatus for suppressing acoustic resonance within an open cavity of an aircraft in flight, comprising:

an extensible aircraft spoiler received within said cavity, said spoiler being adjacent the leading edge of said cavity and extensible into the airflow of the aircraft in flight, said spoiler having an outer edge for engaging the airflow;

a rod having a hollow core, said rod being disposed substantially parallel to said outer edge of said spoiler and spaced a distance therefrom;

a multiplicity of apertures passing radially through the wall of said rod, said apertures being aligned into two groups;

a multiplicity of high frequency synthetic jets received within said hollow core of said rod, each one of said synthetic jets being in fluid communication with one of said apertures, said synthetic jets correspondingly combining to form first and second perturbation elements;

an actuator for driving each of said first and second perturbation elements in a manner such that said first and second perturbation elements operate out of phase with each other.

12. The apparatus of claim 11 further including a pair of endplates attached to the ends of said rod.

* * * * *